US006804107B2

United States Patent
Tuo et al.

(10) Patent No.: US 6,804,107 B2
(45) Date of Patent: Oct. 12, 2004

(54) TUNABLE HIGH-FREQUENCY CAPACITOR

(75) Inventors: Xihe Tuo, Duisburg (DE); Bernd Wagner, Looft (DE); Hans Joachim Quenzer, Itzehoe (DE)

(73) Assignee: Fraunhofer-Gesellaschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 10/149,885

(22) PCT Filed: Dec. 13, 2000

(86) PCT No.: PCT/EP00/12671

§ 371 (c)(1),
(2), (4) Date: Oct. 16, 2002

(87) PCT Pub. No.: WO01/45119

PCT Pub. Date: Jun. 21, 2001

(65) Prior Publication Data
US 2003/0099082 A1 May 29, 2003

(30) Foreign Application Priority Data

Dec. 15, 1999 (EP) .............................. 99125453
Sep. 5, 2000 (DE) ......................... 100 43 758

(51) Int. Cl.$^7$ .............................. H01G 5/01; H01G 5/16
(52) U.S. Cl. ..................... 361/278; 361/290; 361/303
(58) Field of Search ............................. 361/277–282, 361/283.1, 283.2, 283.3, 283.4, 287, 290–292, 301.4, 303–304, 311, 326; 333/175, 185–186

(56) References Cited

U.S. PATENT DOCUMENTS

| 5,901,031 | A | | 5/1999 | Ishige et al. |
| 6,242,989 | B1 | * | 6/2001 | Barber et al. ........... 331/177 V |
| 6,347,237 | B1 | * | 2/2002 | Eden et al. ................. 505/210 |
| 6,373,682 | B1 | * | 4/2002 | Goodwin-Johansson .... 361/278 |

FOREIGN PATENT DOCUMENTS

| DE | 41 36 995 A1 | 5/1993 |
| EP | 0460 930 | 11/1991 |
| EP | 0725 408 A2 | 7/1996 |
| JP | 9-7889 | 1/1997 |

OTHER PUBLICATIONS

Article by T.T.C. Nguyen entitled. "Micromachining Technoloies for Miniaturized Communication Devices" dated Sep. 20, 1998 (15 pages).

* cited by examiner

Primary Examiner—Dean A. Reichard
Assistant Examiner—Eric Thomas
(74) Attorney, Agent, or Firm—Vedder, Price, Kaufman & Kammholz, P.C.

(57) ABSTRACT

A tunable high-frequency capacitor includes first and second fixed electrodes, the first fixed electrode having a high-frequency input connection, and the second fixed electrode having a high-frequency output connection. A movable electrode is arranged facing and spaced apart from the fixed electrodes and is supported by means of a suspension which causes a displacement of the movable electrode in relation to the fixed electrode depending on a control signal that is applied.

8 Claims, 4 Drawing Sheets

TUNABLE HIGH-FREQUENCY CAPACITOR

FIELD OF THE INVENTION

The present invention relates to a tunable capacitor and in particular to a steplessly tunable micromechanic high-frequency capacitor.

BACKGROUND OF THE INVENTION

Tunable capacitors of a high quality factor Q are required, for example, in tunable oscillators, so-called VCOs=voltage control oscillators, and in high-frequency and microwave circuits. Capacitance diodes, also referred to as varactor diodes, are responsible for changing the capacitance. Application of a reverse-biased voltage changes the space charge distribution in the barrier layer of these diodes, and thus their capacitance. In this way, the capacitance decreases as the reverse-biased voltage increases. Typically a change in capacitance of 10 pF to 2 pF is achieved with a change in the reverse-biased voltage from 1 V to 10 V. These diodes, however, have drawbacks that become apparent in particular in microwave oscillators. Thus, for example, the high series resistance leads to low resonance quality factors Q, and noise increases with higher frequencies. A further drawback is that the capacitance's swing of the diodes is limited to about 2 pF at the bottom end.

In the high-frequency or microwave range and in designing appropriate components, it is further always desirable to have adjustable or variable components such as, for example, adjustable capacitors, adjustable resistors or adjustable inductive devices. Such components provide a developer in the high-frequency and microwave ranges with high flexibility in relation to the design of high-frequency and microwave circuits. In re-configurable radio systems of the future, such as, for example, software-based radio systems, these components are referred to as enabling components/technology. This is due to the fact that software-based radio systems require a programmable high-frequency receiver unit (HF receiver unit) which, in addition to other requirements placed upon the high-frequency components, supports at least different frequency bands. In conventional components technology, in particular when mobile radio applications are considered, this represents a big challenge since power consumption, space requirements, weight, as well as electrical behavior, represent very demanding challenges.

The well-known varactor diode described above is, for example, one type of an adjustable capacitor. In addition to the drawbacks mentioned above, a further drawback is that the capacitance of the varactor diode changes in a non-linear manner with the control voltage applied, and that the Q factor of such a varactor diode is generally very low, at about 40. These features limit the range of employment of varactor diodes to applications where the requirements with regard to linearity and the Q factor (the quality) are not demanding. Typical examples of the use of varactor diodes are the above-mentioned voltage-controlled oscillators (VCOs) as well as some variable filters.

In view of these drawbacks, manifold research activities have recently been developed worldwide so as to find solutions for the above adjustable components.

Several concepts for adjustable capacitors have been suggested. These concepts are based on so-called MEMS technology, MEMS standing for "micro-electro-mechanical systems". MEMS technology is an up-and-coming technology that has attracted more and more attention in the last few years. The adjustable MEMS capacitor can be seen as a counterpart of the semiconductor varactor diode.

There are numerous requirements placed upon an MEMS capacitor for use in programmable high-frequency circuits. Ideally, an MEMS capacitor should first of all be a linear device. This means that the capacitance of the MEMS capacitor does not change with the high-frequency signal when a fixed control voltage or a fixed control current is applied. Secondly, the MEMS capacitor should have a high Q factor (high quality), i.e. low losses. Thirdly, an MEMS capacitor should have a broad variability range. The tuning range typically required for mobile phones is from 0.5 pF to 20 pF. In addition, the MEMS capacitor should not consume any power and be readily integratable with other circuits and circuit components.

No MEMS capacitor is currently known which might be available from any manufacturer. However, there are several concepts, such as, for example, the approach described in the essay by T. T. C. Nguyen, "Micromachining Technologies for Miniaturized Communication Devices", Proc. SPIE Conference on Micromachined Devices and Components IV, SPIE volume 3514, September 1998, pp. 24–37. This essay describes a continuously variable capacitance which is actuated in an electrostatical manner and wherein a movable electrode consists of a metallic membrane suspended on a spring beam.

Generally speaking, an MEMS capacitor principally consists of two metal plates, the distance and/or area (overlap area) is controlled by actuators. These actuators are controlled by a voltage in the case of electrostatic actuators, or by a current in the case of thermal actuators.

An example of an MEMS capacitor known from the prior art is described in more detail with reference to FIG. 4. FIG. 4A shows a plan view representation of a known MEMS capacitor, and FIG. 4B shows a cross-sectional representation of the capacitor shown in FIG. 4A.

The MEMS capacitor 400 is formed by a fixed electrode 402 and a movable electrode 404, those electrodes 402 and 404 having essentially the same surface area A. The movable electrode 404 is arranged to substantially overlap the fixed electrode 402. The fixed electrode 402 and the movable electrode 404 are spaced apart by a distance x. The movable electrode 404 is supported by a first suspension 406 and a second suspension 408, the suspensions 406 and 408 being designed so as to move the movable electrode 404 such that the distance x between the electrodes 402 and 404 changes.

The first suspension 406 is fastened on a first fastening element 410, and the second suspension 408 is fastened on a second fastening element 412. These elements 410 and 412 in turn are fastened on surface areas (not shown), such as on a substrate or the like. The first suspension 406 includes a first portion 406a, a second portion 406b and a third portion 406c. The second portion 406b includes an actuator connected between the first portion 406a and the third portion 406c. The first portion 406a is further connected to the first fastening element 410, and the third portion 406c is connected to movable electrode 404. Similarly, the second suspension 408 includes a first portion 408a, a second portion 408b as well as a third portion 408c; the portion 408b also including an actuator. The first portion 408a is further connected to the second fastening element 412, and the third portion 408c is further connected to the movable electrode 404. As can be seen in FIG. 4A, the portions 406b and 408b are arranged in an inclined manner so that the electrode 404 is arranged to be spaced apart from the electrode 402.

The electrode 402 includes a high-frequency input connection 414, as is illustrated by the arrow 416. The second fastening element 412 includes a high-frequency output connection 418, as is illustrated by the arrow 420. The path of a high-frequency signal through the capacitor 400 thus extends from the connection 414 via the electrode 402 to the electrode 404 to the output 418. With regard to the suspensions 406 and 408 it is to be noted that they are not insulated for the high-frequency signal path.

For driving the actuators 406b and 408b, a control connection 422 is provided which is connected to the second fastening element 412 via a line 424. Application of an appropriate control signal to the connection 422 leads to an actuation of the actuators 406b and 408b, whereby a displacement of the movable electrode 404 is caused, so that the distance x between the movable electrode 404 and the fixed electrode 402 changes.

The capacitance C of the capacitor 400 is calculated as follows $$C = \varepsilon_r \cdot \varepsilon_0 \cdot \frac{A}{x}$$

wherein:
$\varepsilon_r$=relative permittivity for the dielectric arranged between the plates,
$\varepsilon_0$=electric field constant,
A=surface area of the capacitor plates, and
x=distance of the capacitor plates.

FIG. 4B depicts a cross-sectional representation of the capacitor shown in FIG. 4A, and the same reference numerals are used for corresponding elements.

Due to the use of the two electrode plates 402 and 404 it is necessary to employ a part of the suspensions 406, 408, and in particular of the actuators 406b and 408b, as a part of the high-frequency signal path. The capacitance of the MEMS capacitor 400 is controllable (variable or adjustable) by adjusting the voltage or current applied to the connection 422. Various materials, such as a silicon, GaAs (gallium arsenide), a ceramic substrate or the like may be used as the carrier substrate (not shown in FIG. 4).

The type of an MEMS capacitor shown in FIG. 4, however, has similar drawbacks as a varactor diode. Due to the fact that the distance x and/or the surface area A between the two electrode plates 402 and 404 does not necessarily change in a linear manner with a control voltage or control current applied, the capacitance changes just as little in a linear manner with the control voltage or control current applied. Since both the control signal (voltage and/or current) and the high-frequency signal occur at the same connection of an MEMS capacitor, such an MEMS capacitor will be a non-linear device, in particular with large high-frequency signals. Just as with a varactor diode, the capacitance may change with the high-frequency signal even when the control signal (voltage and/or current) is fixed. No publications are known in the prior art that address the linearity problem in such MEMS capacitors.

Even though many publications intensely concentrate on the quality (Q factor) and the variability range, it shall be emphasized that with the known capacitors, either the reported Q factor is very low (e.g. much lower than 100 at frequencies of about 1.5 GHz) or the variability range achieved is very limited (e.g. is only from 0.5 pF to 3.5 pF).

SUMMARY OF THE INVENTION

It is the object of the present invention to provide an improved tunable high-frequency capacitor which is a linear device having a high quality factor and a large variability range.

The present invention provides a tunable high-frequency capacitor having a first fixed electrode having a high-frequency input connection, a second fixed electrode having a high-frequency output connection, a movable electrode mounted facing and spaced apart from the first and second fixed electrodes, and a suspension which supports the movable electrode and causes a displacement of the movable electrode in relation to the first and second fixed electrodes depending on a control signal applicable to the suspension.

The present invention is based on a novel concept for an adjustable MEMS capacitor by means of which the drawbacks of varactor diodes can be overcome, so that new adjustable MEMS capacitor devices may be produced which may be used for development of different programmable, both linear and non-linear, high-frequency circuits (LNA, mixers, VCO, PA, filters, etc.), e.g. in re-configurable radio systems, including mobile radio devices etc.

In accordance with an embodiment of the present invention, the suspension includes an actuator which causes the displacement of the movable electrode depending on the control signal applied, and the high-frequency signal path from the high-frequency input connection via the movable electrode to the high-frequency output connection being insulated from the suspension.

In accordance with a preferred embodiment, the capacitor includes a frame structure which supports the movable electrode and on which the suspension is fastened. In addition, an insulating membrane may be provided which is arranged on a surface of the movable electrode; this surface facing the fixed electrode. The insulating membrane may also be supported within the frame structure, in which case the movable electrode is arranged on the insulating membrane.

By means of the suspension and drive by means of a control signal, the present invention enables a movement of the movable electrode in a plane parallel to the fixed electrodes and/or in a plane perpendicular to the fixed electrodes.

In accordance with a preferred embodiment of the present invention the capacitor includes a substrate having a first main surface on which the first and the second fixed electrodes are arranged to be spaced apart. In this case, the suspension is also connected to the first main surface. In accordance with an embodiment, the suspension may be formed by one or several bending beams. Preferably, the suspension is manufactured by means of micromechanical processing.

BRIEF DESCRIPTION OF THE DRAWINGS

In the following, preferred embodiments of the present invention will be explained in more detail with reference to the accompanying drawings, wherein.

DESCRIPTION OF THE PREFERRED EMBODIMENTS

Figure 1:
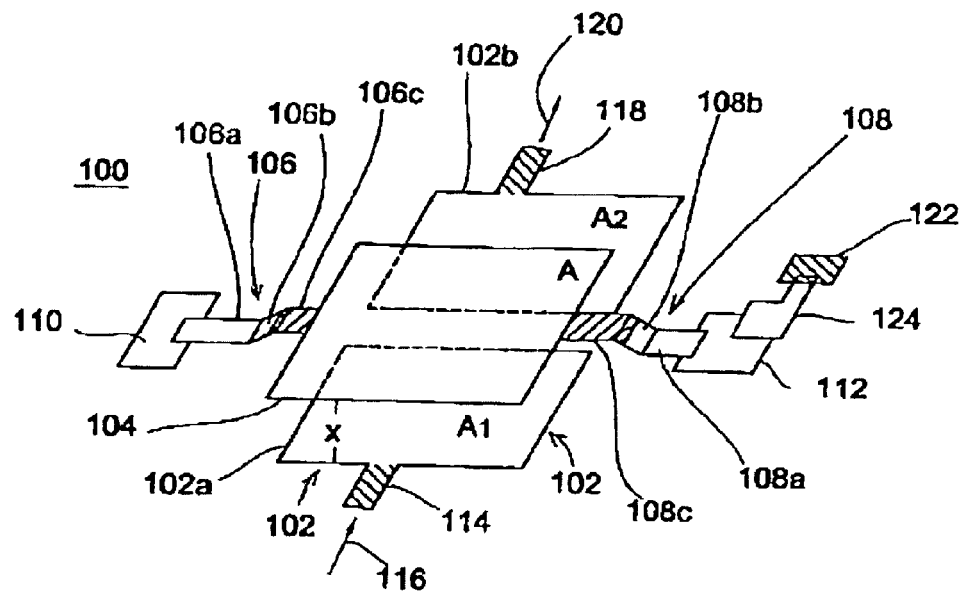
FIG. 1A is a plan view representation of a first embodiment of the inventive tunable high-frequency capacitor.
FIG. 1B is a cross-sectional representation of the capacitor of FIG. 1A.
Figure 1:
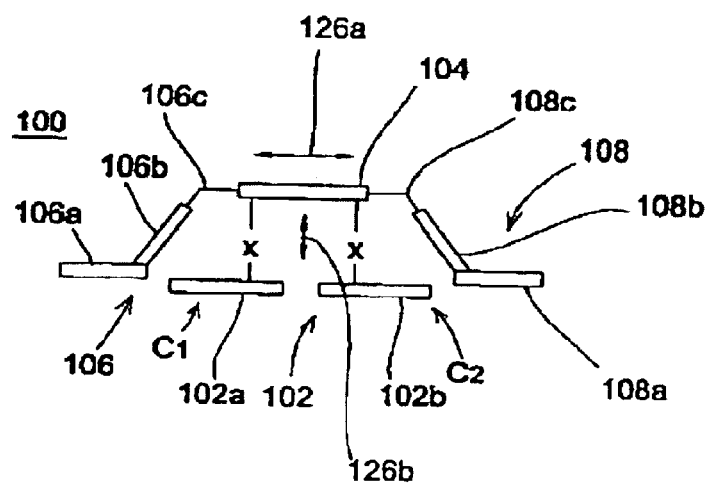

In the following, a first preferred embodiment shall be described in more detail with reference to FIG. 1 wherein FIG. 1A shows a schematic plan view representation of the embodiment, and FIG. 1B illustrates a cross-sectional representation of the capacitor shown in FIG. 1A. With regard to the further description it shall be noted that in the description of the further embodiments, identical reference numerals will be used for similar elements in the figures below and that a renewed description of these elements will be omitted.

FIG. 1 shows an MEMS capacitor 100 which includes a fixed electrode 102 having a first portion 102a and a second portion 102b. The first electrode portion 102a has a first surface area $A_1$, and the second electrode portion 102b has a second surface area $A_2$. These surface areas $A_1$ and $A_2$ may have identical or different sizes.

In addition, a movable electrode 104 is provided which is arranged opposite and at a distance x from the first and second electrode plate portions 102a and 102b of the fixed electrode 102. The movable electrode 104 has a surface area A. The movable electrode 104 is arranged to fully overlap the fixed electrode 102, however the arrangement may be such that the fixed electrode is only partially overlapped by the movable electrode 104, the surface areas $A_1$ and $A_2$ determining, in this connection, the area of the fixed electrode portions 102a and 102b which faces the movable electrode.

The movable electrode 104 is supported by a first suspension 106 and a second suspension 108, so that the distance x from the fixed electrode is adjusted. The first suspension 106 includes a first portion 106a, a second portion 106b as well as a third portion 106c. The first portion 106a of the first suspension 106 is connected to a fastening portion 110 which in turn may be connected to a further supporting structure on which the fixed electrode may also be arranged, as will be described in more detail below. The third portion 106c of the first suspension 106 is connected to the movable electrode 104, and the second portion 106b, which includes an actuator, is arranged between the first portion 106a and the third portion 106c. In the embodiment shown in FIG. 1A the portions 106a and 106c of the suspension 106 are arranged essentially in parallel with the plane in which the electrodes 102 and 104, respectively, are arranged. The portion 106b is arranged so as to face this plane at an angle so that the movable electrode 104 is arranged to be spaced apart from the fixed electrode 102.

Similarly, the second suspension 108 includes a first portion 108a, a second portion 108b and a third portion 108c. The first portion 108a is arranged on a second fastening device 112 which is arranged, as well as the first fastening device 110, on an additional supporting structure, not shown in FIG. 1A. The third portion 108c is connected to the movable electrode 104, and the second portion 108b which, just like the portion 106b of the first suspension 106, includes an actuator, is arranged between the first portion 108a and the third portion 108c. Just like the portions 106a and 106c, the portions 108a and 108c are also arranged in parallel with a plane in which the electrodes 102 and 104, respectively, are arranged, and the portion 108b is arranged at an angle in relation to this plane so as to cause the spaced-apart arrangement of the movable electrode.

The first portion 102a of the bottom electrode 102 includes a high-frequency input 114 to which a high-frequency signal is applied, as is illustrated by the arrow 116. The second portion 102b of the fixed electrode 102 includes a high-frequency output 118, at which the high-frequency signal is output, as is illustrated by the arrow 120. The high-frequency signal path through the capacitor 100 thus starts at the input 114, from where the high-frequency signal passes via the first portion 102a of the fixed electrode 102 to the movable electrode 104, and from there to the second portion 102b to the fixed electrode and on to the output 118. In order to secure this high-frequency signal path through the capacitor 100, the portions 106c and 108c of the suspensions 106 and 108, respectively, for the high-frequency signal path are designed so as to be insulating, as will be described in more detail below.

The capacitor 100 further includes a control connection 122 for receiving a control signal, the control connection being connected, via a line 124, to the fastening device 112 and further to the suspensions 108 and 106. A suitable control signal is applied to the control connection 122 so as to actuate the actuators arranged in the portions 106b and 108b so as to cause a displacement of the movable electrode 104 in relation to the fixed electrodes 102a, 102b.

The capacitor 100 has a total capacitance C determined by a series connection of two capacitors. The two capacitors are formed, on the one hand, by the first portion 102a of the bottom electrode 102 and the opposite portions of the movable electrode 104, and, on the other hand, by the second portion 102b of the bottom electrode 102 and the correspondingly opposite portion of the top electrode. Thus, the total capacitance is as follows $$C = \frac{C_1 \cdot C_2}{C_1 + C_2}$$

wherein:
$C_1$=capacitance value of the first capacitor
$C_2$=capacitance value of the second capacitor,
the respective capacitance values being calculated as follows:

$$C_1 = \varepsilon_0 \cdot \varepsilon_r \cdot \frac{A_1}{x}$$

$$C_2 = \varepsilon_0 \cdot \varepsilon_r \cdot \frac{A_2}{x}$$

wherein
$\varepsilon_0$=electrical field constant,
$\varepsilon_r$=relative permittivity for the dielectric arranged between the electrodes 102 and 104,
$A_1$, $A_2$=reflective capacitor surface area, and
x=distance between the electrodes 102, 104.

FIG. 1B shows a cross-sectional representation of the capacitor shown in FIG. 1A; the same reference numerals being used. Both capacitors $C_1$ and $C_2$ are shown again for illustration purposes. In addition, the arrows 126a and 126b indicate the directions of movement in which the movable electrode 104 may move when an appropriate control signal is applied to the control connection 122, shown in FIG. 1A, for actuating the actuators 106b, 108b.

Figure 4:
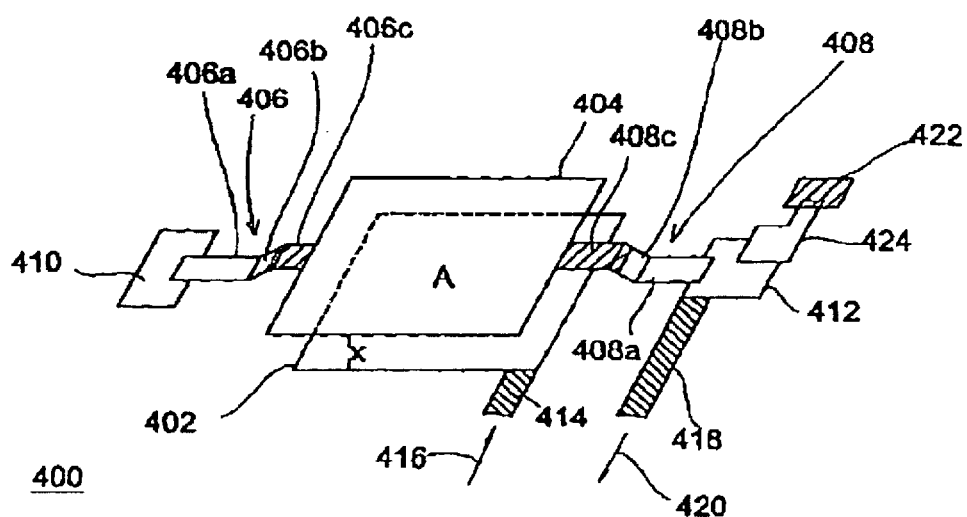
FIG. 4A is an example of a conventional MEMS capacitor.
FIG. 4B is a cross-sectional representation of the capacitor of FIG. 4A.
Figure 4:
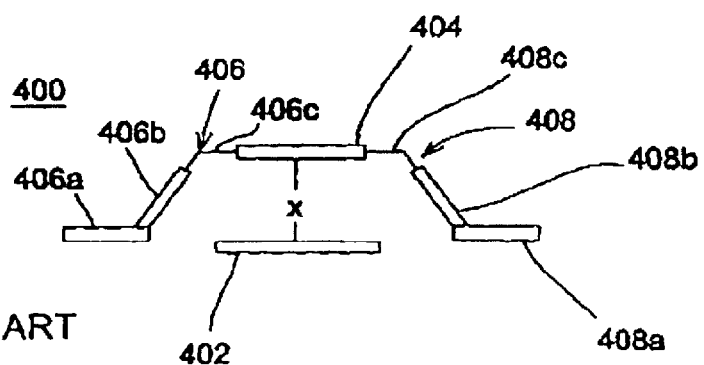

As can be seen in FIG. 1, the inventive capacitor includes three metal plates 102a, 102b, 104 instead of the two metal plates used in the prior art (as in FIG. 4). The two bottom plates 102a and 102b are separately connected to a high-frequency input 114 and a high-frequency output 118. The top electrode 104 is supported by the two suspensions 106 and 108, the suspensions being moved upward and downward (see arrow 126b in FIG. 1B) and sideward (see arrow 126a in FIG. 1B) by the actuators 106b, 108b, which are in turn driven by a control voltage or a control current applied to the connection 122, depending on their design. A further feature of the present invention is that the suspension 106, 108 is insulated electrically from the top electrode 104.

As has already been stated above, the capacitance of the capacitor 100 is equivalent to two serially connected capacitors. The advantage of the present invention is that, with the inventive structure, the high-frequency signals and the control signals (voltages or currents) use different connections. The different signal paths, i.e. the high-frequency signal path and the control signal path, are insulated from each other, so that the capacitance value of the capacitor 100 will not change, i.e. will remain constant, when the control signal maintain a fixed value, even if the high-frequency signals change. A linear device is thus achieved.

The inventive capacitor exhibits a significant advantage also with regard to the quality characteristics that can be achieved. Since the suspensions and the actuators, which generally entail high losses, are not used as part of the high-frequency signal path, and since the metal plates 102/104 exhibit very low losses, the Q factor (quality) of such a capacitor can be maintained at a very high value, e.g. higher than 100 at 1.5 GHz.

A further advantage is that a large variability range may additionally be realized since the suspensions enable the distance x between the top plate 104 and the bottom plates 102a, 102b to be varied across a large range. A further improvement of the variability range of the capacitor can be achieved by the fact that actuators cause a lateral displacement of the suspension, so that in adjusting the capacitance value, the effective capacitor plate surface area results, in addition to the distance x, as an additional degree of freedom, the effective capacitor plate surface area being that surface area of a bottom electrode 102a or 102b which is overlaid by the top electrode. By displacing the top electrode 104 correspondingly, these surface areas $A_1$ and $A_2$ may also be changed.

The advantage of the inventive apparatus is that it is suitable in particular for applications in a multitude of programmable linear or non-linear high-frequency circuits or microwave circuits.

Figure 2:
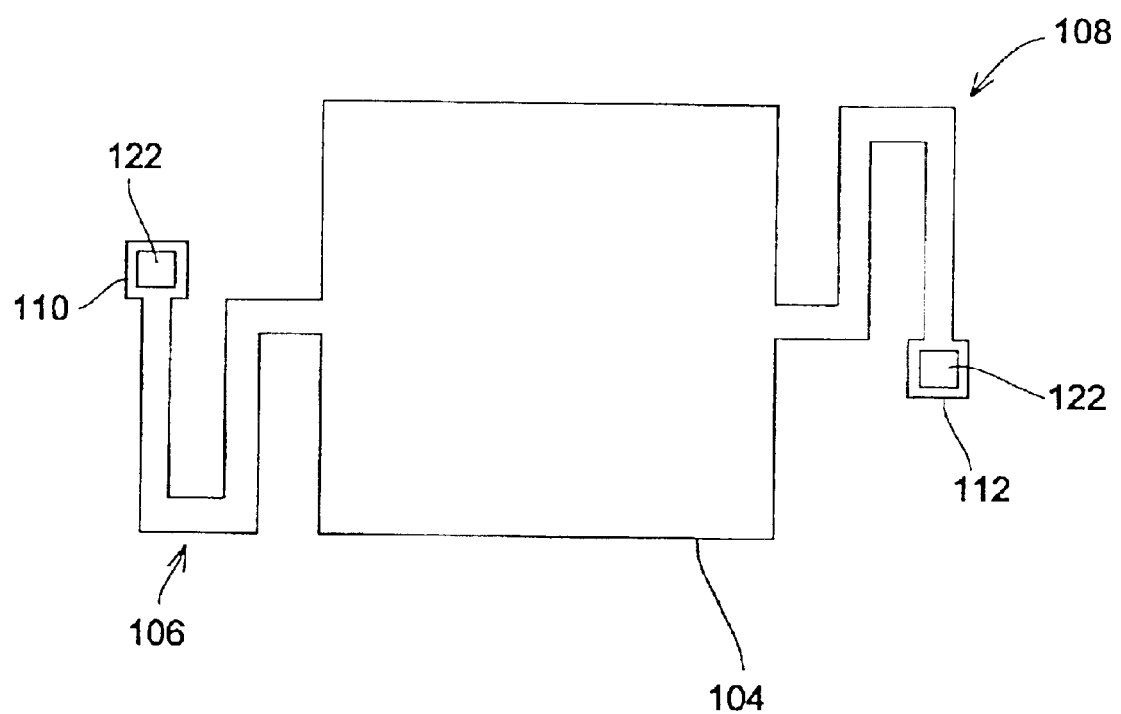
FIG. 2 is an example of a design of the suspension and of the movable electrode.

FIG. 2 represents an example of the suspension of the top electrode 104. As can be seen, the suspensions 106 and 108 are realized by a bending beam, respectively, one end of which is connected to the electrode 104, and the other end of which is connected to the fastening device 110 and 112, respectively. As a deviation from the embodiment shown in FIG. 1, in FIG. 2 each fastening device 110 and 112 is provided with a control connection 122 so as to obtain a control signal, e.g. in the form of a voltage signal, which causes an appropriate deformation of the bending beam 106, 108 and thus causes an appropriate displacement of the electrode 104. The bending beams 106 and 108 are produced from an electrically insulating material so as to ensure the decoupling between the high-frequency signal through the capacitor and the control signal path.

Figure 3:
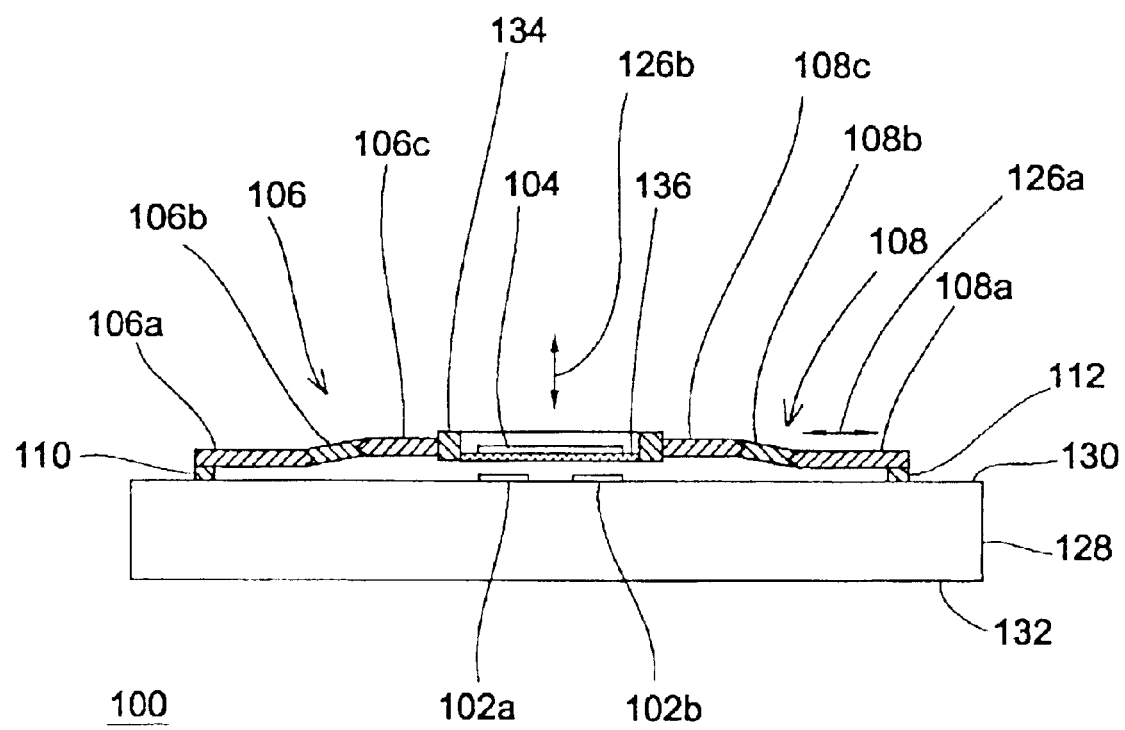
FIG. 3 is a further embodiment of the inventive tunable high-frequency capacitor.

FIG. 3 shows a further embodiment of the inventive capacitor, and in particular an alternative realization of the suspension of the movable electrode such that it is insulated from the suspensions.

The capacitor 100 includes a substrate 128 having a first main surface 130 and a second main surface 132 facing the first main surface 130. The bottom electrodes 102a and 102b are arranged on the first main surface 130. The suspensions 106 and 108 are also connected to the first main surface 130 via the fastening devices 110 and 112.

The capacitor 100 further includes a frame structure 134. The portions 106c and 108c are connected to the frame 134. An insulating membrane 136 is arranged so as to be spread out in the frame, the movable electrode 104 resting on the membrane. The membrane 136 thus is arranged between the movable and the fixed electrodes. By means of the arrangement shown in FIG. 3 the decoupling of the high-frequency signal path and the control signal path is ensured in an alternative manner.

So as to prevent a capacitive coupling of the signal between the top metal plate 104 and the actuator structure, which may be comprised of metal or silicon, the distance adjusted by the portions 106c and 108c of the suspensions must be as large as possible. This is particularly important if no insulating membrane 136 is used.

The insulating membrane 136 shown in FIG. 3, which is arranged in the frame 134 of the actuator structure, may be used instead of the thick insulating layer. As can be seen, in this approach the top plate 104 of the capacitor is arranged on the insulating membrane 136.

What is claimed is:

1. A tunable high-frequency capacitor comprising
a first fixed electrode having a high-frequency input connection;
a second fixed electrode having a high-frequency output connection;
a movable electrode mounted facing and spaced apart from the first and second fixed electrodes; and
a suspension which supports the movable electrode and causes a displacement of the movable electrode in relation to the first and second fixed electrodes depending on a control signal applicable to the suspension, the suspension and the movable electrode being electrically insulated from each other,
wherein the suspension is configured to allow a movement of the movable electrode both in a plane parallel to the fixed electrodes and in a plane perpendicular to the fixed electrodes.

2. The tunable high-frequency capacitor as claimed in claim 1, wherein the suspension includes an actuator which causes the displacement of the movable electrode depending on the control signal applied, a high-frequency signal path from the high-frequency input connection via the movable electrode to the high-frequency output connection being insulated from the suspension.

3. The tunable high-frequency capacitor as claimed in claim 1, comprising a frame structure supporting the movable electrode, the suspension being connected to the frame structure.

4. The tunable high-frequency capacitor as claimed in claim 1, comprising an insulating membrane which is arranged on the surface of the movable electrode which faces the fixed electrodes.

5. The tunable high-frequency capacitor as claimed in claim 4, wherein the insulating membrane is supported within a frame structure, the movable electrode being arranged on the insulating membrane.

6. The tunable high-frequency capacitor as claimed in claim 1, comprising a substrate having a first main surface on which the first and the second fixed electrodes are arranged so as to be spaced apart from each other, the suspension being connected to the first main surface.

7. The tunable high-frequency capacitor as claimed in claim 1, wherein the suspension is formed by one or several bending beams.

8. The tunable high-frequency capacitor as claimed in claim 1, wherein the suspension is produced by micromechanical processing.

* * * * *